US012257806B1

(12) United States Patent
Zheng

(10) Patent No.: US 12,257,806 B1
(45) Date of Patent: Mar. 25, 2025

(54) EXPANDABLE MATERIAL WITH CROSSED LINES, EXPANSION SYSTEM AND METHOD FOR SUPPLYING PACKAGE MATERIAL

(71) Applicant: YCD Green Packaging Technology Company Limited, Foshan (CN)

(72) Inventor: Wuming Zheng, Foshan (CN)

(73) Assignee: YCD Green Packaging Technology Company Limited, Foshan (CN)

( * ) Notice: Subject to any disclaimer, the term of this patent is extended or adjusted under 35 U.S.C. 154(b) by 0 days.

(21) Appl. No.: 18/371,069

(22) Filed: Sep. 21, 2023

(51) Int. Cl.
*B31D 5/00* (2017.01)

(52) U.S. Cl.
CPC .... *B31D 5/0065* (2013.01); *B31D 2205/0017* (2013.01)

(58) Field of Classification Search
CPC .......... B31D 5/0065; B31D 2205/0035; B31D 2205/0017; B31D 1/0031; B65H 2801/63; B65H 2701/11231; B65H 2701/11232; B65H 2701/1824
USPC .......................................... 428/136; 493/967
See application file for complete search history.

(56) References Cited

U.S. PATENT DOCUMENTS 3,228,710 A * 1/1966 Wieslaw ................ B65H 45/28 229/92.1
3,655,501 A * 4/1972 Tesch ...................... B32B 27/00 428/137
3,673,757 A * 7/1972 Willis .................. B65H 45/103 53/429
5,667,871 A * 9/1997 Goodrich .................. B31C 5/00 428/338
8,613,993 B2 * 12/2013 Kuchar .................... D04D 9/00 229/87.01
8,802,211 B2 * 8/2014 Cattacin ................. B65H 45/28 428/43
9,533,809 B2 * 1/2017 Kuchar .................. B65D 65/38
11,059,256 B2 * 7/2021 Cheich ................. B31D 1/0031
11,260,615 B2 * 3/2022 Cheich ................. B65H 23/048
11,351,750 B2 * 6/2022 Cheich ................. B31D 1/0031
11,504,937 B2 * 11/2022 Cheich ................... B65H 23/14
(Continued)

OTHER PUBLICATIONS

Bruce Dou, Most common-used weight for kraft paper substrate, Apr. 4, 2022 [retrieved on Jan. 26, 2024]. Retrieved from the Internet <URL: https://www.vp-packaging.com/substrate-materials/kraft-paper-substrate/most-common-weight-for-kraft-paper-substrate/> (Year: 2022).*

*Primary Examiner* — Joshua G Kotis
(74) *Attorney, Agent, or Firm* — Leason Ellis LLP

(57) ABSTRACT

Provided is an expandable material with crossed lines, an expansion system and a method for supplying a package material. Said expandable material comprises: creasing lines, wherein the creasing lines extend along a horizontal direction of said expandable material and are arranged at intervals in a longitudinal direction of said expandable material, and said expandable material is continuous on the creasing lines and folded along the creasing lines to form a saw-toothed stack; and slits, wherein the slits pass through said expandable material, extend along a first direction, and are inclined to the creasing lines and arranged at intervals on slit lines defined in the first direction, the slit lines are arranged at intervals in the longitudinal direction of said expandable material, and the slits of two adjacent slit lines are mutually staggered in the longitudinal direction of said expandable material.

14 Claims, 9 Drawing Sheets

(56) References Cited

U.S. PATENT DOCUMENTS

| | | | | |
|---|---|---|---|---|
| 11,649,128 | B2 * | 5/2023 | Lemmens | B31D 5/0065 493/339 |
| 11,801,654 | B2 * | 10/2023 | Chiang | B31F 1/0019 |
| 11,834,240 | B2 * | 12/2023 | Parker | B65D 27/005 |
| 2016/0039164 | A1 * | 2/2016 | Tuczek | B31D 3/005 428/116 |
| 2016/0067938 | A1 * | 3/2016 | Goodrich | B31D 5/0065 493/361 |
| 2021/0315426 | A1 * | 10/2021 | Goodrich | B31D 5/006 |
| 2022/0143946 | A1 * | 5/2022 | Talda | B65D 81/03 |
| 2023/0022987 | A1 * | 1/2023 | Corrigan | B31D 5/0065 |
| 2023/0094170 | A1 * | 3/2023 | Cheich | B31D 5/0065 428/136 |
| 2023/0118371 | A1 * | 4/2023 | Demers | B65B 65/02 226/24 |
| 2023/0278778 | A1 * | 9/2023 | Goodrich | B65D 85/672 53/410 |

* cited by examiner

EXPANDABLE MATERIAL WITH CROSSED LINES, EXPANSION SYSTEM AND METHOD FOR SUPPLYING PACKAGE MATERIAL

TECHNICAL FIELD

The present disclosure relates to the field of expandable materials for buffering, in particular to an expandable material with crossed lines, an expansion system and a method for supplying a package material.

BACKGROUND

An expandable material is used for packaging products, which can fill a gap between the product and the package box, and play a role of buffering and supporting, thereby protecting the product during the transportation. The expandable material is usually supplied in a form of roll. When in use, a section of expandable material is extracted from the roll, and the expandable material in a two-dimensional plane state is expanded to a three-dimensional state through its own incisions, and then wound on a to-be-packaged product.

The expandable material supplied in the form of roll has a disadvantage of inconvenient extraction. On one hand, at the beginning of extraction, a large tensile force is needed to make the roll rotate, which is easy to tear the incision on the expandable material, and at the end of the extraction, the roll is not easy to stop accurately due to an action of inertia. On the other hand, the weight and the inertia of the roll will decrease gradually with use, and when pulling the roll, the applied tensile force is changed accordingly, resulting in poor quality consistency of the obtained expandable material.

SUMMARY

The present disclosure is intended to solve at least one of technical problems existing in the prior art. For this purpose, the present disclosure provides an expandable material with crossed lines, an expansion system and a method for supplying a package material. The expandable material with the crossed lines can be supplied in a stacked form, so as to avoid the expandable material with the crossed lines being torn when extracted, and to improve the quality consistency of the expandable material with the crossed lines.

The expandable material with the crossed lines provided by the present disclosure comprising:

- creasing lines, wherein the creasing lines extend along a horizontal direction of the expandable material with the crossed lines and are arranged at intervals in a longitudinal direction of the expandable material with the crossed lines, and the expandable material with the crossed lines is continuous on the creasing lines and folded along the creasing lines to form a saw-toothed stack; and
- slits, wherein the slits pass through the expandable material with the crossed lines, extend along a first direction, and are inclined to the creasing lines and arranged at intervals on slit lines defined in the first direction, the slit lines are arranged at intervals in the longitudinal direction of the expandable material with the crossed lines, and the slits of two adjacent slit lines are mutually staggered in the longitudinal direction of the expandable material with the crossed lines.

The expandable material with the crossed lines provided by the present disclosure at least has the following technical effects.

The expandable material with the crossed lines provided by the present disclosure has the creasing lines, through which the expandable material with the crossed lines may be folded to form a stack, so as to be supplied in a stacked form. When the expandable material with the crossed lines is extracted from a discharge end of the stack, the weight of the stack will not hinder the extraction of the expandable material with the crossed lines, which on one hand makes the expandable material with the crossed lines not be torn easily during extraction, and on the other hand can improve the quality consistency of the expandable material with the crossed lines.

According to some embodiments of the present disclosure, the stack makes the expandable material with the crossed lines be extracted and expanded continuously at an acceleration of greater than or equal to 15 $m/s^2$ without being tearing, preferably, at an acceleration of greater than or equal to 20 $m/s^2$, and more preferably, at an acceleration of greater than or equal to 30 $m/s^2$ and less than or equal to 80 $m/s^2$.

The expansion system provided by the present disclosure comprises:

- at least one expandable material, part or all of the expandable material is the expandable material with the crossed lines, and the expandable material with the crossed lines comprises:
  - creasing lines, wherein the creasing lines extend along a horizontal direction of the expandable material with the crossed lines and are arranged at intervals in a longitudinal direction of the expandable material with the crossed lines, and the expandable material with the crossed lines is continuous on the creasing lines and folded along the creasing lines to form
- a saw-toothed stack; and
  - slits, wherein the slits pass through the expandable material with the crossed lines, extend along a first direction, and are inclined to the creasing lines and arranged at intervals on slit lines defined in the first direction, the slit lines are arranged at intervals in the longitudinal direction of the expandable material with the crossed lines, and the slits of two adjacent slit lines are mutually staggered in the longitudinal direction of the expandable material with the crossed lines; and
- an expansion device, comprising a notch for supplying a package material to users, wherein the expandable material passes through the notch, and the notch enables the expandable material to expand to a three-dimensional state from a two-dimensional plane state so as to form the package material.

The expansion system provided by the present disclosure at least has the following technical effects.

The expandable material expands after passing through the notch of the expansion device, and the expandable material with the crossed lines extends from the stack and passes through the notch. When the expandable material with the crossed lines is extracted from the notch, the expansion device enables the slits of the expandable materials with the crossed lines to be opened, so that the expandable material with the crossed lines expands to the three-dimensional state from the two-dimensional plane state. Since the expandable material with the crossed lines in the expansion system is supplied in the stacked form, when the expandable material with the crossed lines is extracted from a discharge end of the stack, the weight of the stack will not hinder the extraction of the expandable material with the crossed lines, which on one hand makes the expandable material with the crossed lines not be torn easily when extracted, and on the other hand, can improve the quality consistency of the extracted expandable material with the crossed lines.

According to some embodiments of the present disclosure, the stack makes the expandable material with the crossed lines be extracted and expanded continuously at an acceleration of greater than or equal to 15 $m/s^2$ without being tearing, preferably, at an acceleration of greater than or equal to 20 $m/s^2$, and more preferably, at an acceleration of greater than or equal to 30 $m/s^2$ and less than or equal to 80 $m/s^2$.

According to some embodiments of the present disclosure, when the expandable material with the crossed lines is continuously extracted from the notch at an acceleration of 20 $m/s^2$, a tensile force applied to the expandable material with the crossed lines is less than 30 N.

According to some embodiments of the present disclosure, included angles formed between the slits and the creasing lines are 0.15°-60°, preferably, 0.3°-30°.

According to some embodiments of the present disclosure, the creasing lines are intersected with at least two slit lines.

According to some embodiments of the present disclosure, the two adjacent creasing lines are partially or completely staggered from each other in a stack direction.

According to some embodiments of the present disclosure, a material of the expandable material with the crossed lines is a renewable material.

According to some embodiments of the present disclosure, the material of the expandable material with the crossed lines is any one of kraft paper, printing paper or bleached paper, and a gram weight of the expandable material with the crossed lines is 20-150 g, preferably 40-120 g.

According to some embodiments of the present disclosure, the expansion device comprises at least two friction elements, which are arranged at intervals, the notch is formed between two adjacent friction elements, and the friction elements are configured to contact with the expandable materials so as to apply frictional resistance.

According to some embodiments of the present disclosure, the expansion device comprises a regulating component, the regulating component is connected to the friction elements, and the regulating component is configured to regulate the pressure applied by the two adjacent friction elements to the expandable material.

According to some embodiments of the present disclosure, the friction element comprises a rotating roller, the regulating component comprises a damping element, and the damping element is in contact with the roller.

According to some embodiments of the present disclosure, the expansion system comprises a plurality of expandable materials, adjacent expandable materials have different three-dimensional states, so that the two expandable materials in the three-dimensional states are hard to embed and overlap.

According to some embodiments of the present disclosure, the two adjacent expandable materials with the crossed lines have the slits of different specifications.

According to some embodiments of the present disclosure, "the two adjacent expandable materials with the crossed lines have the slits of different specifications" comprises at least one of the following situations: the slits of the two expandable materials with the crossed lines have different widths; the included angles formed between the slits and the creasing lines of the two expandable materials with the crossed lines are different; the distances of the slits of the two expandable materials with the crossed lines on the slit lines are different; and the distances of the slit lines of the two expandable materials with the crossed lines are different.

According to some embodiments of the present disclosure, the expansion system further comprises a workbench, and a shelf for placing the expandable material with the crossed lines mounted above or below a table top of the workbench, wherein the expansion device is mounted at an edge of the table top.

A method for supplying a package material using the expansion system provided by the present disclosure, comprising the following steps of:

- preparing an expandable material;
- passing an end part of the expandable material into a notch from one side of the notch;
- extracting the expandable material from the other side of the notch, wherein the notch enables the expandable material to expand to a three-dimensional state; and
- disconnecting the expandable material, so as to obtain the package material.

The foregoing expansion system is used in the method for supplying the package material. Therefore, the method for supplying the package material provided by the present disclosure has the beneficial effects brought by the foregoing expansion system, and will not be discussed in further detail here.

According to some embodiments of the present disclosure, in the step of extracting the expandable material from the other side of the notch, a plurality of expandable materials are extracted simultaneously from one or more notches, so as to obtain the package material with a multi-layer structure.

According to some embodiments of the present disclosure, the step of preparing the expandable material comprises:

- providing a belt material as a raw material;
- generating slits on the belt material;
- generating creasing lines on the belt material; and
- folding the belt material along the creasing lines, thereby obtaining the expandable material with the crossed lines supplied in a saw-toothed stack.

BRIEF DESCRIPTION OF DRAWINGS

The above and/or additional aspects and advantages of the present disclosure are obvious and easy to understand in combination with the description for the embodiments in the drawing below, where.

Figure 1:
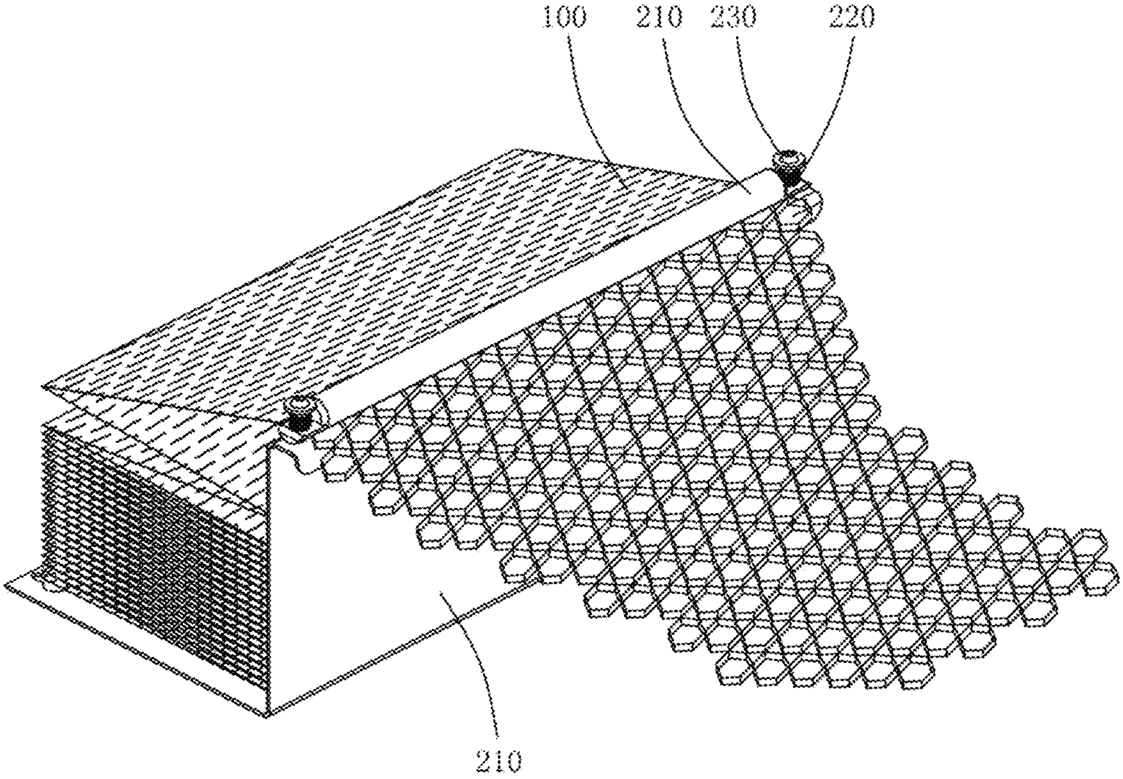
FIG. 1 is an axonometric schematic diagram of an expansion system in an embodiment of the present disclosure.

REFERENCE NUMERALS expandable material with crossed lines 100, creasing line 110, slit 120, expansion device 200, friction element 210, elastic element 220, screw 230, damping element 240, workbench 300, shelf 310.

DETAILED DESCRIPTION

The embodiments of the present disclosure are described in detail below, the examples of the embodiments are shown in the drawings, and from beginning to end, the same or similar numerals indicate the same or similar elements or elements with the same or similar function. The embodiments described with reference to the drawings are exemplary, which is merely used for explaining the present disclosure, instead of being understood as a limitation to the present disclosure.

In the description of the present disclosure, it is understood that orientation or position relationships indicated by the terms "upper", "lower", "front", "rear", "left", and "right", and the like are based on the orientation or position relationships as shown in the drawings, for case of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In the description of the present disclosure, the meaning of "several" is one or more, the meaning of "a plurality" is more than two, "greater than", "less than", "exceeding" and the like are understood as excluding the original number, and "above", "below", "within" and the like are understood as including the original number. The described "first" and "second" are merely used for distinguishing technical features, instead of being understood as indicating or implying relative importance or impliedly indicating the quantity of the showed technical features or impliedly indicating the precedence relationship of the showed technical features.

In the description of the present disclosure, unless specific limitation otherwise, terms "provided", "install", "contact" and the like should be generally understood. Those skilled in the art may reasonably determine the specific meaning of the terms in the present disclosure in combination with the specific contents of the technical solution.

Referring to FIG. 1, the expansion system provided by the present disclosure includes an expandable material and an expansion device, where the quantity of the expandable material is at least one, part or all of the expandable material is the expandable material with the crossed lines 100, and the expandable material with the crossed lines 100 is supplied in a stacked form. The expansion device 200 includes a notch for supplying a package material to users, the expandable material passes through the notch, and the notch can make at least one expandable material expand to a three-dimensional state from a two-dimensional plane state so as to form the package material with a single-layer structure or a multi-layer structure.

The expandable material used in the existing expansion system has slits 120, which can be opened by applying the tensile force to the expandable material, so that the expandable material can expand to the three-dimensional state. However, the existing expandable material does not have creasing lines 110, so that the expandable material is usually supplied in a form of roll.

Figure 2:
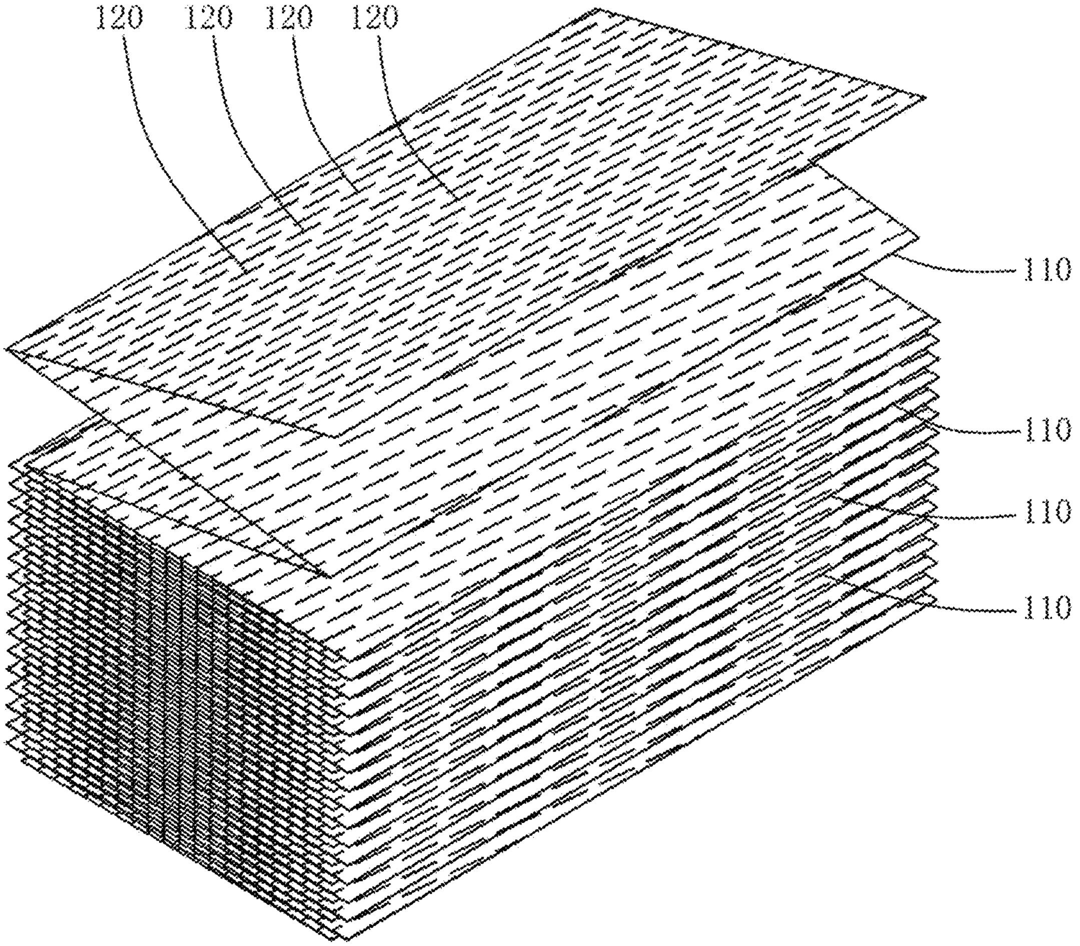
FIG. 2 is an axonometric schematic diagram of an expandable material with crossed lines supplied in a stacked form in an embodiment of the present disclosure.
Figure 3:
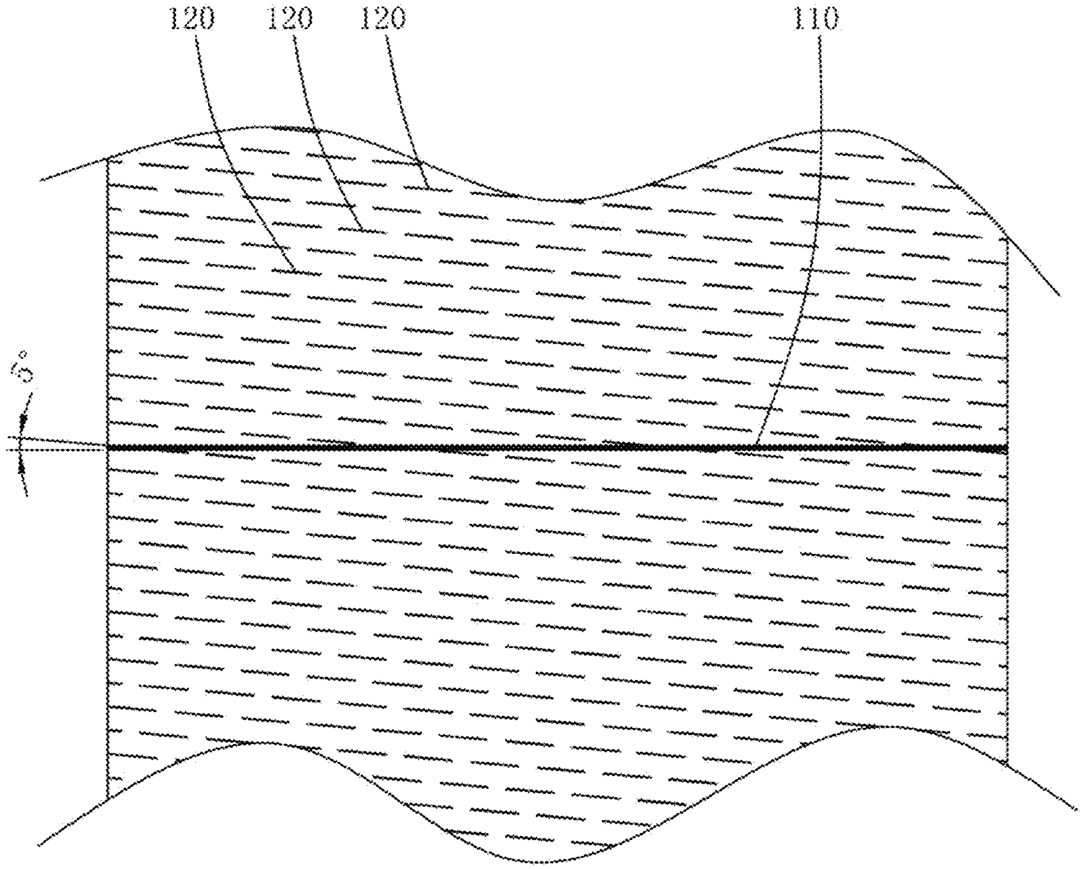
FIG. 3 is a schematic diagram of an expandable material with crossed lines in an expanded state in an embodiment of the present disclosure.

Referring to FIG. 2 and FIG. 3, the expandable material with the crossed lines 100 provided by the present disclosure includes creasing lines 110 and slits 120, the creasing lines 110 extend along a horizontal direction of the expandable material with the crossed lines 100 and are arranged at intervals in a longitudinal direction of the expandable material with the crossed lines 100, and the expandable material with the crossed lines 100 is continuous on the creasing lines 110 and folded along the creasing lines 110 to form the saw-toothed stack. The slits 120 pass through the expandable material with the crossed lines 100, extend along a first direction, and are inclined to the creasing lines 110 and arranged at intervals on slit lines defined in the first direction. The slit lines are arranged at intervals in the longitudinal direction of the expandable material with the crossed lines 100, and the slits 120 of two adjacent slit lines are mutually staggered in the longitudinal direction of the expandable material with the crossed lines 100.

The expandable material with the crossed lines 100 is presented in a strip shape in FIG. 3 when expanded. It can be understood that "crossed lines" mean the creasing lines 110 and the slit lines, and the creasing lines 110 are not parallel to the slit lines, so that the creasing lines 110 are crossed with the slit lines. The longitudinal direction refers to an extending direction of the expandable material with the crossed lines 100, and the horizontal direction refers to a direction vertical to the longitudinal direction. The expandable material with the crossed lines 100 are folded at a position where the creasing lines 110 are located, so that the expandable material with the crossed lines 100 forms the stacked form shown in FIG. 2. The saw-toothed stack formed by the expandable material with the crossed lines 100 may be defined as crossfold stack.

A section of the expandable material with the crossed lines 100 between the two adjacent creasing lines 110 may be defined as a folded sheet. The shape of the folded sheet is rectangular in FIG. 2, and in other scenarios, the folded sheet may also be presented in a trapezoid, a parallelogram and other regular shapes, or presented in irregular shapes.

Return to FIG. 1, when not expanding, the expandable material with the crossed lines 100 is in a two-dimensional plane state in which the thickness of the expandable material with the crossed lines 100 is far less than the length and width. When extracting the expandable material with the crossed lines 100, on one hand, the extraction action can apply an acting force along the extraction direction to the expandable material with the crossed lines 100, on the other hand, the expansion device 200 applies the acting force which is usually the frictional resistance along an inverse direction of the extraction direction to the expandable material with the crossed lines 100. Under the action of the two acting forces, the two parts of the expandable material with the crossed lines 100 that is located at two sides of the slits 120 move in different directions, so that the slits 120 are opened, and the expandable material with the crossed lines 100 expands to the three-dimensional state in which the thickness of the expandable material with the crossed lines 100 increases greatly.

Specifically refer to FIG. 2, usually the stack is placed in a vertical manner, that is, the folded sheet is folded vertically on the undermost folded sheet, at this time, the folded sheet, located at the uppermost stack, does not bear the weight of other folded sheets, and the discharge end of the stack refers to the uppermost stack.

In other scenarios, the stack may also be placed in an inclined even horizontal manner, and at this time, one side of the folded sheet, not bearing the weight of other folded sheets in the stack, is the discharge end of the stack.

It may be understood that the stack weight will not hinder the extracting of the expandable material with the crossed lines 100 when the expandable material with the crossed lines 100 is extracted from the discharge end of the stack, therefore the acting force required to extract the expandable material with the crossed lines 100 approaches to constant, which on one hand makes the expandable material with the crossed lines 100 not be torn easily when extracted, and on the other hand, can improve the quality consistency of the expandable material with the crossed lines 100.

Strength refers to the ability of the expandable material with the crossed lines 100 to resist the tearing. The term "extracted continuously" means that the expandable material with the crossed lines 100 is not torn under this acceleration, that is, the creasing lines 110 and the slits 120 will not be torn under the acting force.

The expandable material with the crossed lines 100 supplied in the stacked form and the existing expandable material that is supplied in a form of roll and has the same strength are compared below.

For the existing expandable material supplied in the form of roll, the inertia, generated by the weight of the whole roll, needs to be overcome when extracting the expandable material, causing that the acceleration should not be too high when extracting the expandable material. Assuming that the raw material of the expandable material is 80 g of kraft paper, if the expandable material is extracted and expanded from the unused 250 m long roll, due to greater weight of the roll, the maximum acceleration generally does not exceed 10 $m/s^2$ during extraction, and otherwise the expandable material will be torn from the slits 120. After a period of use, the weight of the roll decreases, so the acceleration may be increased.

For the expandable material with the crossed lines 100 supplied in the stacked form, the inertia, needed to be overcome when extracted, is far less than that of the expandable material supplied in the form of roll, thus the expandable material with the crossed lines 100 is allowed to be continuously extracted in an acceleration greater than or equal to 15 $m/s^2$, so that the extraction efficiency of the expansion system is improved.

In some embodiments, if the expandable material with the crossed lines 100 is extracted from the notch of the expansion device 200 at an acceleration of 20 $m/s^2$, the tensile force applied to the expandable material with the crossed lines 100 is less than 30 N. It may be understood that the tensile force herein is composed of at least two parts, the first part of tensile force is used for overcoming the resistance generated by the stack weight when extracting the expandable material with the crossed lines 100 from the discharge end of the stack, and since the expandable material with the crossed lines is supplied in the stacked form, the first part of tension force may be less than 10 N; and the second part of tension force is used for overcoming the resistance, applied by the notch to the expandable material with the crossed lines 100. Moreover, under the combined action of the second part of tension force and the resistance applied by the notch, the expandable material with the crossed lines 100, passing through the notch, expands to the three-dimensional state.

The maximum acceleration born by the expandable material with the crossed lines 100 depends on itself tensile strength, the creasing lines 110 and the slits 120 will reduce the tensile strength of the expandable material with the crossed lines 100 to some degree, and a suitable design can reduce the weakening of the creasing lines 110 and the slits 120 to the tensile strength. In some possible embodiments, the expandable material with the crossed lines 100 is allowed to be continuously extracted at an acceleration greater than or equal to 20 $m/s^2$, and in some possible embodiments, the acceleration may reach 30 $m/s^2$ to 80 $m/s^2$ when extracting the expandable material with the crossed lines 100.

It may be understood that the acceleration during the extraction determines the efficiency of the package material supplied by the expansion system. Taking an object with a wrapping size of 8 inch*4 inch*4 inch (approximately 20.3 cm*10.2 cm*10.2 cm) as an example, assuming that each package is packed in a uniform acceleration manner, the package material is extracted from the expansion system in a relatively stationary initial state, 10 times of package are required, and the length of the package material required for each package is 12 inch (30 cm). In a first assumption, the expandable material supplied in the manner of roll is used, the acceleration is 10 $m/s^2$, and the extraction of package material approximately needs 0.25 s, so it is 2.5 s for ten times. In a second assumption, the expandable material with the crossed lines 100 supplied in the stacked manner is used, the acceleration is 20 $m/s^2$, and the extraction of package material approximately needs 0.17 s, it is 1.7 s for ten times, and the time is shortened by 32% compared with the first assumption. In a third assumption, the expandable material with the crossed lines 100 supplied in the stacked manner is used, the acceleration is 35 $m/s^2$, and about 0.13 s is required to extract the package material, it is 1.3 s for ten times, and shortened by 48% compared with the first assumption.

Although the above is only the ideal experiment under the assuming conditions, it can be recognized from therein that the expandable material with the crossed lines 100 supplied in the stacked manner can greatly improve the supply efficiency of the package material, thereby effectively improving the efficiency of goods package.

It may be understood that the existing package material may also be made of a non-expandable paper material, the non-expandable paper material may be provided with the creasing lines 110 and supplied in the stacked manner, and the non-expandable paper material may also have the incision passing through the creasing lines 110 to facilitate disconnecting the non-expandable paper material from the positions where the creasing lines 110 are located. However, the non-expandable paper material does not have the slits 120, through which the non-expandable paper material can expand to the three-dimensional shape, and the non-expandable paper material needs to deform under the extrusion action of external force so as to generate wrinkles, thereby forming the three-dimensional package material.

In some possible embodiments, the creasing lines 110 are formed with weakening slots. With the weakening slots, the creasing lines 110 are folded more easily, and the weakening slots do not pass through the expandable material with the crossed lines 100, therefore the weakening slots have less weakening effect on the tensile strength of the expandable material with the crossed lines 100. In order to further reduce the weakening of the expandable material with the crossed lines 100, the depth of the weakening slots may be smaller. For example, the depth is less than, such as 50%, 35%, 20%, 5% of the thickness of the expandable material with the crossed lines 100. The weakening slots may be provided through a cutting processing manner, and according to the different cutting tools, the weakening slots may have different section shapes.

Figure 4:
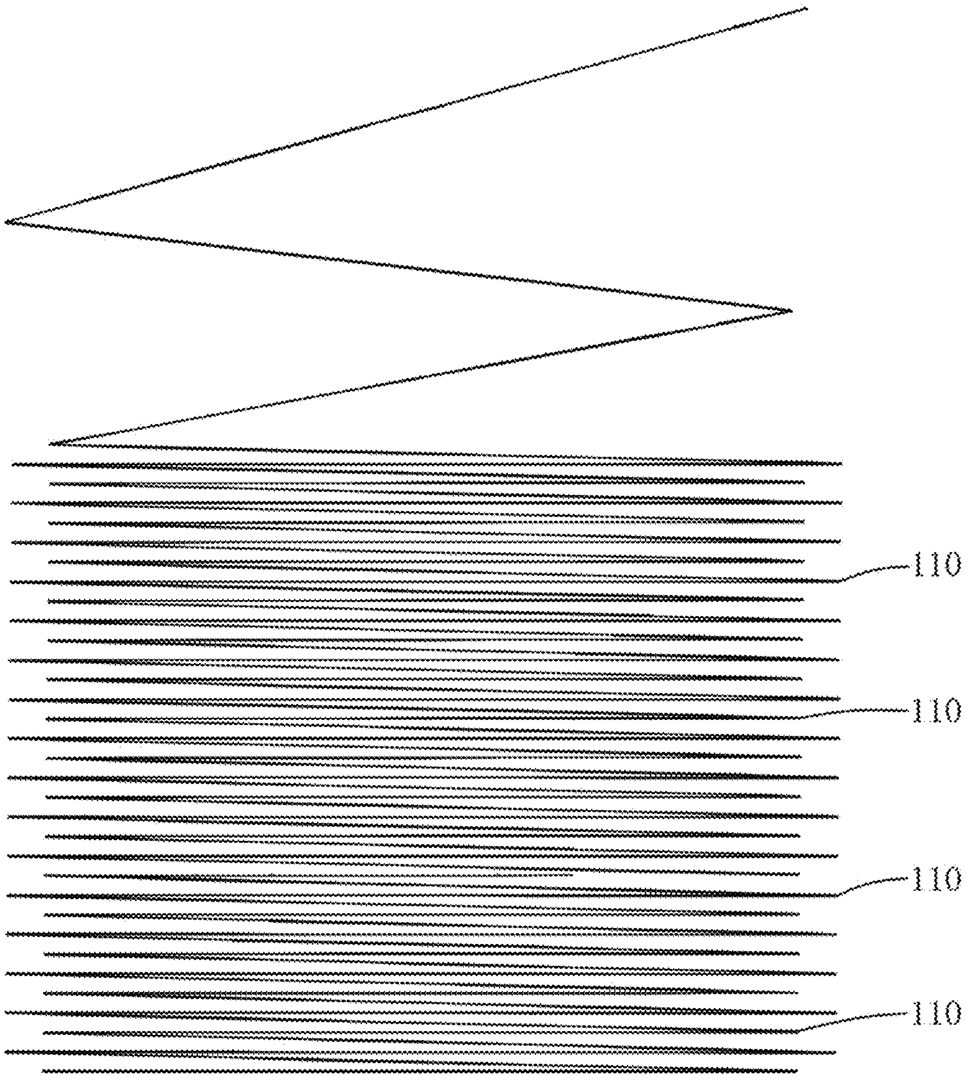
FIG. 4 is a side view of an expandable material with crossed lines supplied in a stacked form in an embodiment of the present disclosure.
Figure 5:
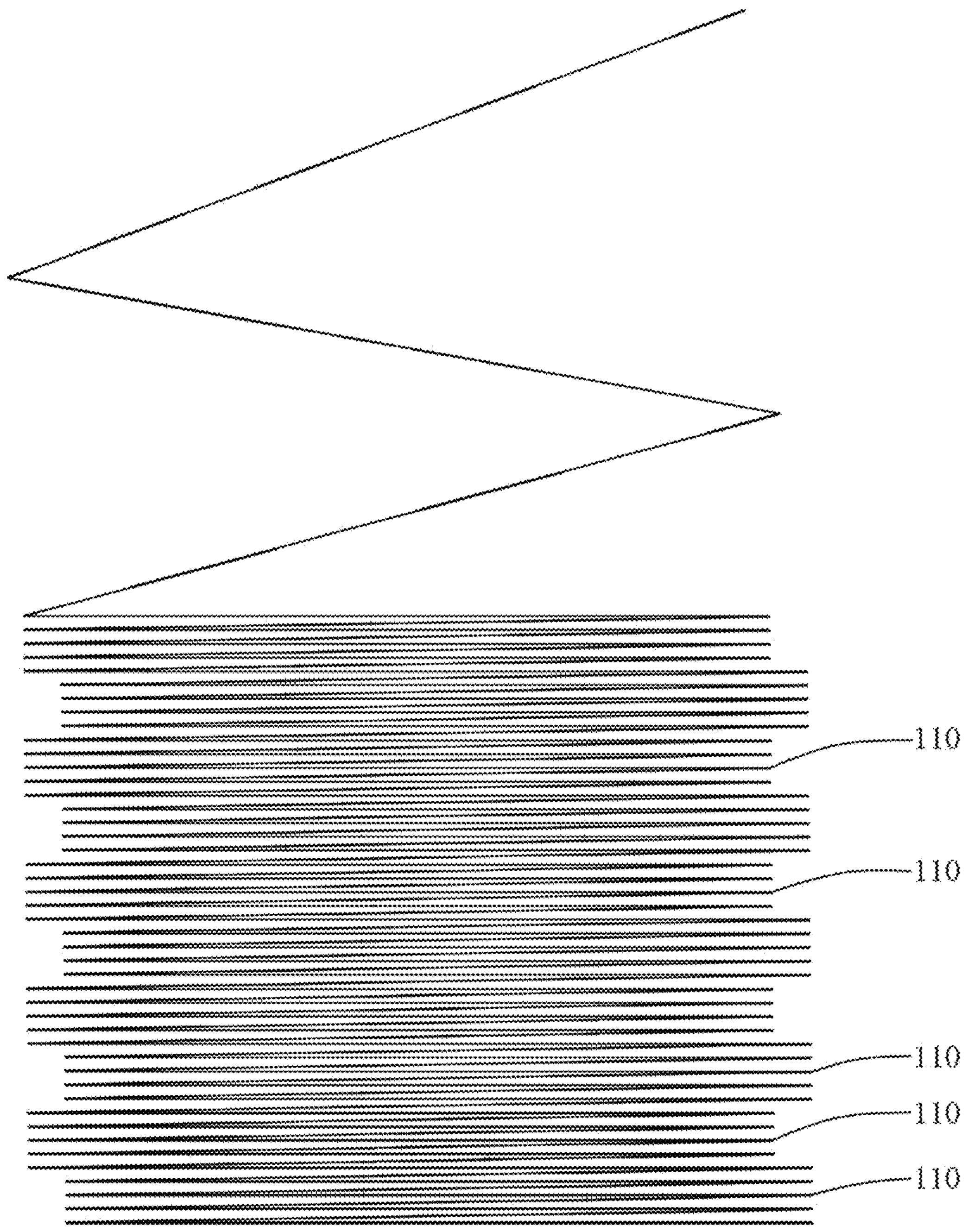
FIG. 5 is a side view of an expandable material with crossed lines supplied in a stacked form in another embodiment of the present disclosure.

When supplied in the stacked form, due to the influence of the extrusion action, the thickness of the part that the creasing lines 110 are located may be greater than the sum of the thickness of the two folded sheets, so the stack shape is likely to be affected, resulting in a depressed middle and raised edges of the stack, which is not beneficial for improving the number of layers of stack. Therefore, in some possible embodiments, two adjacent creasing lines 110 are partially or completely staggered from each other in the stacked direction. In other words, the distance between two adjacent creasing lines 110 is defined as the length of the folded sheet, and the folded sheet at least has two lengths. When two folded sheets are connected together through the creasing lines 110 and have different lengths, the two creasing lines 110, located at the ends, away from the connecting part of the two folded sheets, are mutually staggered. FIG. 4 shows an embodiment that two adjacent creasing lines 110 are completely staggered from each other in the stacked direction, and FIG. 5 shows an embodiment that the two adjacent creasing lines 110 are partially staggered from each other in the stacked direction, so as to be beneficial for improving the number of layers of the stack.

The included angles formed between the slits 120 and the creasing lines 110 determine the expansion effect when the expandable material with the crossed lines 100 are extracted along the longitudinal direction. In order to balance the processing difficulty and the expansion effect, the included angles may be limited between 0.15° and 60°, for example, the included angles may be 0.15°, 0.3°, 0.5°, 1°, 5°, 15°, 45°, 60°, etc.; and preferably, the included angles may be between 0.3° and 30°. In the embodiment of FIG. 3, the included angles formed between the slits 120 and the creasing lines 110 are 5°.

The raw material of the expandable material with the crossed lines 100 may be paper. Specifically speaking, since the creasing lines 110 in the present disclosure have less weakening strength on the expandable material with the crossed lines 100, the expandable material with the crossed lines 100 have low requirement on the strength performance of the raw material, and the raw material may be the recycled paper. Meanwhile, the raw material may be any one of the kraft paper, printing paper and bleached paper, and for example, in some possible embodiments, the expandable material with the crossed lines 100 may be the recycled kraft paper. In addition, the gram weight of the expandable material with the crossed lines 100 may be between 20 g and 150 g, for example, the gram weight may be 20 g, 30 g, 50 g, 60 g, 80 g, 100 g, 120 g, 150 g and the like, and preferably, the gram weight is between 40 g and 120 g.

The raw material of the expandable material with the crossed lines 100 may be plastics or composite materials. Considering from an environmentally friendly perspective, the expandable material with the crossed lines 100 may be the renewable material, and the renewable material refers to the material that may be manufactured or produced as quick as possible so as to follow the consumption speed under the specific time and space conditions of the nature, for example, bio-based plastics, etc.

Now, return to FIG. 1, in some possible embodiments, in order to apply the acting force to the expandable material with the crossed lines 100, the expansion device 200 includes at least two friction elements 210, which are arranged at intervals, and a notch is formed between the two adjacent friction elements 210. The two friction elements 210 contact with the two sides of the expandable material with the crossed lines 100 respectively, and apply a pressure to the expandable material with the crossed lines 100. When extracting the expandable material with the crossed lines 100, the friction elements 210 apply the frictional resistance to the expandable material with the crossed lines 100, thereby promoting the expandable material with the crossed lines 100 to expand.

The friction elements 210 may contact with the expandable material with the crossed lines 100 by a pressurizing plane, for example, in FIG. 1, where one friction element 210 is a pressing rod, the other friction element 210 is a base, on one hand, the base carries the stack of the expandable material with the crossed lines 100, and on the other hand, the base is formed as a pressing plate. The expandable material with the crossed lines 100 is pressed on the pressing plate through the pressing rod, and the pressurizing plane uniformly applies the frictional resistance to the expandable material with the crossed lines 100, so as to avoid tearing the expandable material with the crossed lines 100 caused by great local stress of the expandable material with the crossed lines 100.

In order to enable the frictional resistance applied by the friction elements 210 to be regulated, in some possible embodiments, the expansion device 200 includes a regulating component, the regulating component is connected to the friction elements 210, and can regulate the pressure applied by the two adjacent friction elements 210 to the expandable material with the crossed lines 100. For example, in FIG. 1, the expansion device 200 is provided with two friction elements 210, the regulating component includes an elastic element 220 and a screw 230, the elastic element 220 is a pressure spring, the screw 230 is mounted on the first friction element 210 through a thread, the second friction element 210 may be movably arranged between a screw cap of the screw 230 and the first friction element 210, one end of the pressure spring resists to the screw cap of the screw 230 while the other end resists to the second friction element 210, and the pressure spring makes the two friction elements 210 compress mutually.

Figure 6:
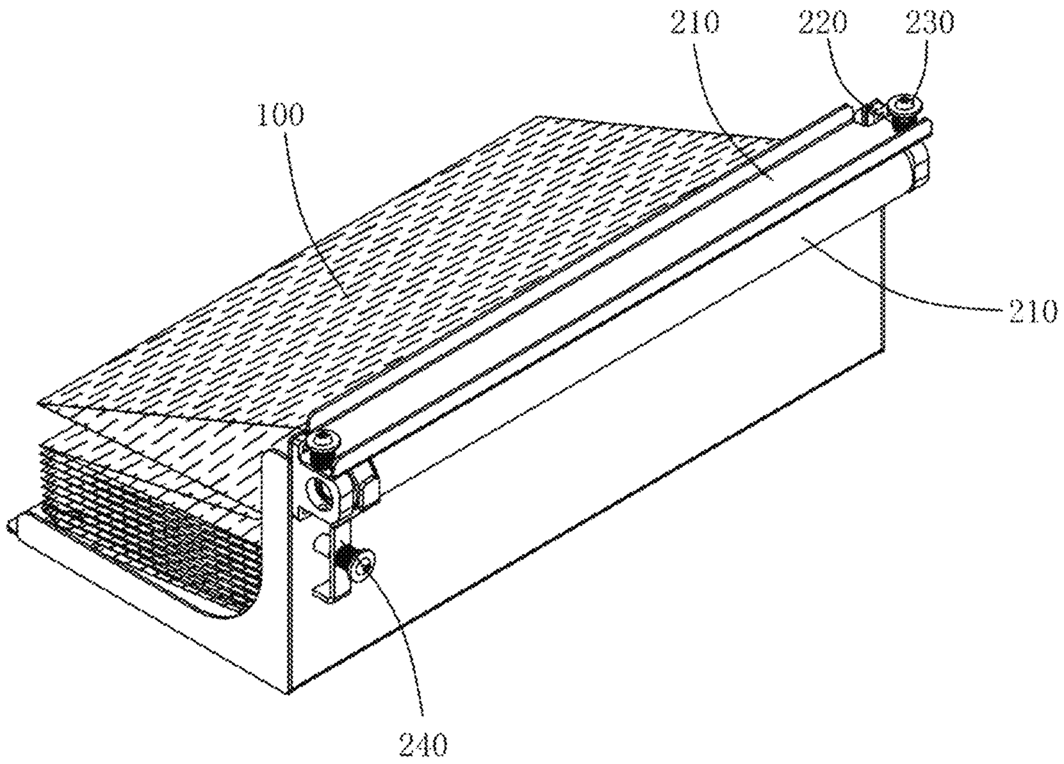
FIG. 6 is an axonometric schematic diagram of an expansion system provided with a roller in an embodiment of the present disclosure.

In another possible embodiments, the friction element 210 includes a rotating roller, the regulating component includes a damping element 240, and the damping element 240 is in contact with the roller. For example, refer to the embodiments in FIG. 6 and FIG. 7, one friction element 210 is a pressing rod, while the other friction element 210 is a roller, a notch is formed between the pressing rod and the roller, the elastic element 220 and the screw 230 act on the pressing rod, so that the pressing rod presses the roller. The damping element 240 is pressed on the roller, so as to apply the acting force for hindering the roller to rotate, this acting force balances with that applied by the expandable material to the roller when extracting the expandable material, and therefore the frictional resistance applied by the roller to the expandable material may be changed accordingly by changing the pressure of the damping element 240 to the roller.

Figure 7:
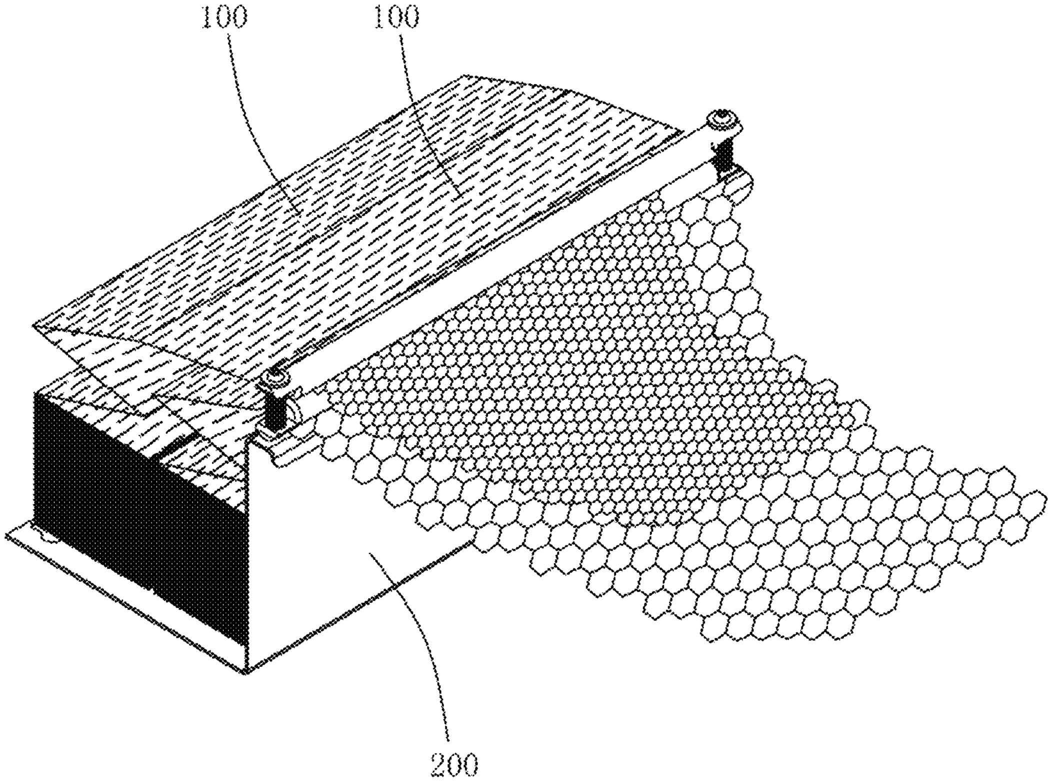
FIG. 7 is an axonometric schematic diagram of an expansion system in an embodiment of the present disclosure, where end parts of two expandable materials pass through respective corresponding notch, respectively.
Figure 8:
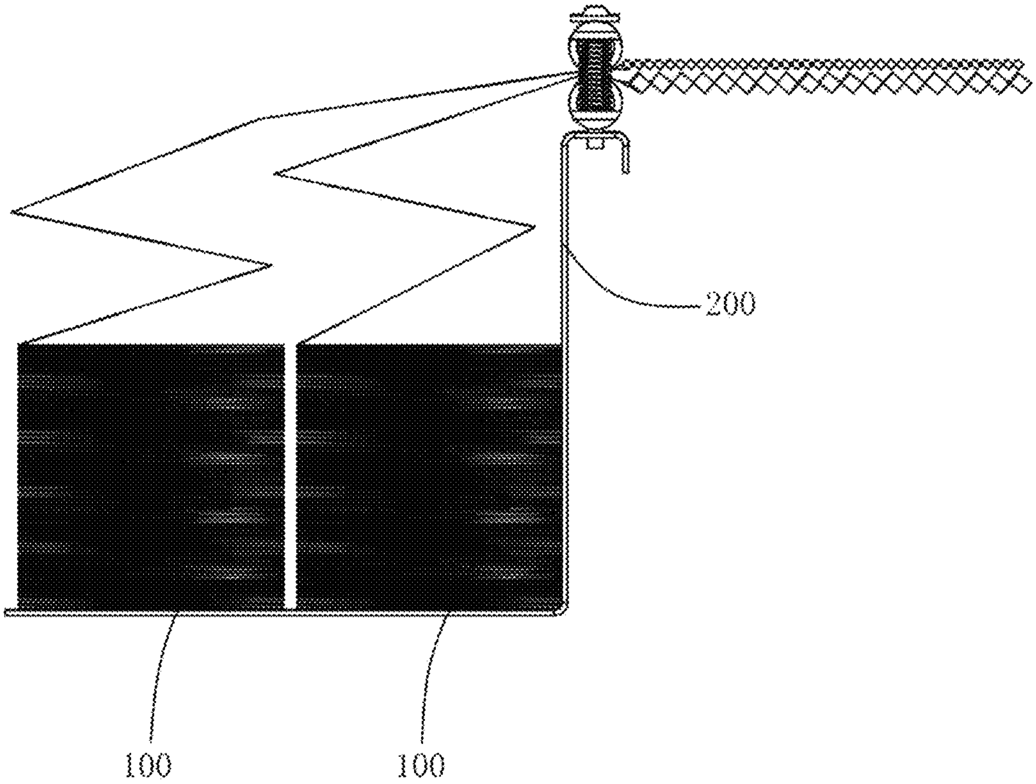
FIG. 8 is an axonometric schematic diagram of an expansion system in another embodiment of the present disclosure, where end parts of two expandable materials pass through the same notch.

When the expansion system comprises only one expandable material, the package material supplied by the expansion system is a single-layer structure, and when the expansion system comprises a plurality of expansion materials, the plurality of expansion materials are folded together after expanding, thereby forming the package material with the multi-layer structure. In the embodiment of FIG. 7, the expansion system comprises two expandable materials and two corresponding notches, ends of the two expandable materials pass through their respective corresponding notch respectively. In the embodiment of FIG. 8, the expansion system comprisesonly one notch, and the ends of the two expandable materials pass through the same notch.

In some possible embodiments, the expansion system includes a plurality of expandable materials, the adjacent expandable materials have different three-dimensional states, so that the two expandable materials in the three-dimensional states are hard to embed and overlap.

In some possible embodiments, the expansion system includes a plurality of expandable materials with the crossed lines 100, and the two adjacent expandable materials with the crossed lines 100 have the slits 120 of different specifications. The slits 120 of different specifications enable the expandable materials with the crossed lines 100 to have different three-dimensional shapes after expanding, and therefore the two expandable materials with the crossed lines 100 cannot be overlapped together, thereby providing the expandable materials with the crossed lines 100 more effectively.

Specifically speaking, "the two adjacent expandable materials with the crossed lines 100 have the slits 20 of different specifications" includes at least one of the following situations:

(1) the slits 120 of the two expandable materials with the crossed lines 100 have different widths;

(2) the included angles formed between the slits 120 and the creasing lines 110 of the two expandable materials with the crossed lines 100 are different;

(3) the distances of the slits 120 of the two expandable materials with the crossed lines 100 on the slit lines are different; and (4) the distances of the slit lines of the two expandable materials with the crossed lines 100 are different.

Figure 9:
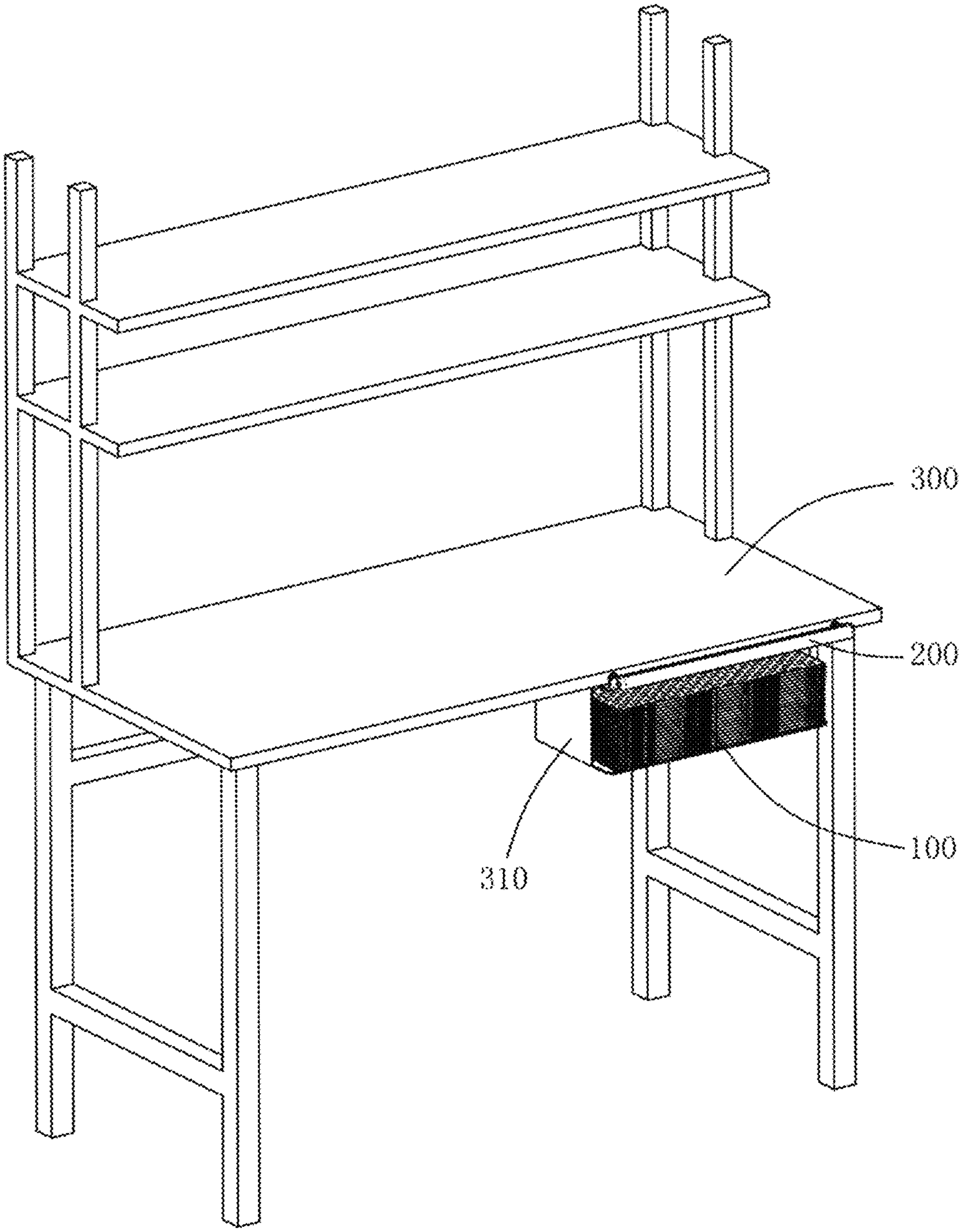
FIG. 9 is an axonometric schematic diagram of an expansion system with a workbench.

The expansion device has a simple structure for convenient storage and placement. In some possible embodiments, the expansion system further includes a workbench 300, and a shelf 310 for placing the expandable material with the crossed lines 100 placed above or below a table top of the workbench 300, wherein the expansion device 200 is mounted at an edge of the table top. In this manner, the expandable material with the crossed lines 100 and the expansion device 200 will not occupy the space of the table top. For example, refer to FIG. 9, the shelf 310 is hung below the table top.

The present disclosure further provides a method for supplying a package material using the expansion system provided by the present disclosure, comprising following steps of:

preparing an expandable material;

passing an end part of the expandable material into a notch from one side of the notch;

extracting the expandable material from the other side of the notch, wherein the notch enables the expandable material to expand to a three-dimensional state; and disconnecting the expandable material, so as to obtain the package material.

Since the expansion system provided by the present disclosure is used, for the expandable material with the crossed lines 100 supplied in the stacked form, the inertia, needed to be overcome when extracting the expandable material with the crossed lines 100, is far less than that of the expandable material supplied in the form of roll, thus the expandable material with the crossed lines 100 is allowed to be extracted at a higher acceleration greater, so that the package material can be provide more effectively and conveniently.

In some possible embodiments, in the step of extracting the expandable material from the other side of the notch, a plurality of expandable materials are extracted simultaneously from one or more notches, so as to obtain the package material with a multi-layer structure.

In some possible embodiments, the step of preparing the expandable material comprises:

providing a belt material as a raw material;

generating slits 120 on the belt material;

generating creasing lines 110 on the belt material; and folding the belt material along the creasing lines 110, thereby obtaining the expandable materials with the crossed lines 100 supplied in the saw-toothed stack.

Specifically speaking, in some possible embodiments, the belt material is conveyed forwards along itself length direction (i.e. the longitudinal direction), and passes through a slit generation device, a creasing line generation device and a stack device in turn. The slit generation device generates the slits 120 on the belt material by cutting, the creasing line generation device generates the creasing lines 110 on the belt material in an extrusion manner, the stack device cuts the belt material according to a preset length, and then folds the belt material, so as to obtain the expandable material with the crossed lines 100 supplied in the saw-toothed stack In the description of the specification, the descriptions of terms "one embodiment", "some embodiments", "schematic embodiment", "example", "specific example", or "some examples" intend to be included in at least one embodiment or example of the present disclosure in combination with the specific characteristics, structures, materials or characteristics of this embodiment or example. In this specification, the schematic expression of the above terms does not need for the same embodiment or example. Moreover, the described specific characteristics, structures, materials or characteristics may be combined in one or more embodiments or examples in a suitable manner.

Although the embodiments of the present disclosure have been presented and described, those of ordinary skill in the art may understand that various changes, modifications, replacements and deformations can be made to these embodiments without deviating from the principle of purpose of the present disclosure, and the scope of the present disclosure is defined by the appended claims and their equivalents.

The invention claimed is:

1. An expansion system, comprising:

at least one expandable material, part or all of the at least one expandable material is expandable material with crossed lines, the expandable material with the crossed lines comprises:

creasing lines, wherein the creasing lines extend along a horizontal direction of the expandable material with the crossed lines and are arranged at intervals in a longitudinal direction of the expandable material with the crossed lines, and the expandable material with the crossed lines is continuous through the creasing lines and folded along the creasing lines to form a saw-toothed stack; and slits, wherein the slits pass through the expandable material with the crossed lines, extend along a first direction, and are inclined to the creasing lines and arranged at intervals on slit lines defined in the first direction, the slit lines are arranged at intervals in the longitudinal direction of the expandable material with the crossed lines, wherein the creasing lines are crossed with the slit lines to form the crossed lines, and the slits of adjacent slit lines are mutually staggered in the longitudinal direction of the expandable material with the crossed lines; and an expansion device, comprising a notch for supplying a package material to users, wherein the at least one expandable material passes through the notch, and the notch enables the at least one expandable material to expand to a three-dimensional state from a two-dimensional plane state, so as to form the package material with a single-layer structure or a multi-layer structure.

2. The expansion system according to claim 1, wherein included angles formed between the slits and the creasing lines are 0.15°-60°.

3. The expansion system according to claim 1, wherein the creasing lines are intersected with at least two slit lines.

4. The expansion system according to claim 1, wherein the two-adjacent creasing lines are staggered from each other in a stacked direction.

5. The expansion system according to claim 1, wherein a section of expandable material with the crossed lines between adjacent creasing lines is defined as a folded sheet, a distance between the adjacent creasing lines is defined as a length of the folded sheet.

6. The expansion system according to claim 1, wherein a material of the expandable material with the crossed lines is a renewable material.

7. The expansion system according to claim 1, wherein a material of the expandable material with the crossed lines is any one of kraft paper, printing paper or bleached paper, and a gram weight of the expandable material with the crossed lines is 20-150 g.

8. The expansion system according to claim 1, wherein the expansion device comprises at least two friction elements, which are arranged at intervals, the notch is formed between adjacent friction elements, and the friction elements are configured to contact with the expandable material so as to apply frictional resistance.

9. The expansion system according to claim 8, wherein the expansion device comprises a regulating component, the regulating component is connected to the friction elements, and the regulating component is configured to regulate pressure applied by the adjacent friction elements to the expandable material.

10. The expansion system according to claim 9, wherein the friction elements comprise a rotating roller, the regulating component comprises a damping element, and the damping element is in contact with the roller.

11. The expansion system according to claim 1, wherein the expansion system comprises a plurality of expandable materials, adjacent expandable materials have different three-dimensional states to avoid embedding and overlapping with each other.

12. The expansion system according to claim 11, wherein the adjacent expandable materials with the crossed lines have the slits of different specifications.

13. The expansion system according to claim 12, wherein the adjacent expandable materials with the crossed lines have the slits of different specifications comprises at least one of the following situations: the slits of the expandable materials with the crossed lines have different widths; the included angles formed between the slits and the creasing lines of the expandable materials with the crossed lines are different; the distances of the slits of the expandable materials with the crossed lines on the slit lines are different; and the distances of the slit lines of the expandable materials with the crossed lines are different.

14. The expansion system according to claim 1, further comprising a workbench, and a shelf for placing the expandable material with the crossed lines mounted above or below a table top of the workbench, wherein the expansion device is mounted at an edge of the table top.

* * * * *